United States Patent
Tomita

Patent Number: 6,151,165
Date of Patent: Nov. 21, 2000

[54] STEREOSCOPIC VISUAL UNIT

[75] Inventor: Seijiro Tomita, Tokyo, Japan

[73] Assignee: Sony Corporation, Tokyo, Japan

[21] Appl. No.: 09/303,886

[22] Filed: May 3, 1999

Related U.S. Application Data

[63] Continuation of application No. PCT/JP98/03967, Sep. 4, 1998.

[30] Foreign Application Priority Data

Sep. 5, 1997 [JP] Japan ................................. 9-241299

[51] Int. Cl.⁷ .......................... G02B 27/22; G02B 23/00; G02B 7/02
[52] U.S. Cl. ......................... 359/466; 359/474; 359/477; 359/408; 359/413; 359/817
[58] Field of Search ................................ 359/407, 408, 359/413, 415, 409, 474, 477, 472, 473, 480, 481, 422, 432, 817, 466; 351/233, 234, 235

[56] References Cited

U.S. PATENT DOCUMENTS 5,181,139  1/1993  Benitze ................................ 359/408
5,282,086  1/1994  Goldstein ............................. 359/408

FOREIGN PATENT DOCUMENTS 36-32850  12/1961  Japan .
62-24255   6/1987  Japan .
63-115116  7/1988  Japan .

Primary Examiner—Cassandra Spyrou
Assistant Examiner—Audrey Chang
Attorney, Agent, or Firm—Frommer Lawrence & Haug, LLP.; William S. Frommer

[57] ABSTRACT

The present invention is usable as a stereoscopic visual unit capable of obtaining fine stereoscopic effects and also usable as binoculars, by provided with a first housing 11 that has a pair of convex lenses 12 and 13 and disposed at a specified space and having mutually almost parallel optical axes; and a second housing 20 that has a supporting part 25 supported swingable to the first housing for keeping a pair of pictures to be stereoscopically viewed on the optical axis of each convex lens in its first swing position, and a pair of concave lenses 26 and 27 disposed on the optical axis of each convex lens, a specified distance apart from each convex lens in its second swing position.

5 Claims, 5 Drawing Sheets

STEREOSCOPIC VISUAL UNIT

This application is a continuation of PCT application PCT/JP98/03967 filed Sep. 4, 1998.

FIELD OF THE ART

The present invention relates to a stereoscopic visual unit for viewing a pair of pictures having a specified space between them.

BACKGROUND ART

Heretofore,, such stereoscopic visual unit is composed of a pair of convex lenses which are disposed at almost the space of both eyes and have optical axes mutually almost parallel, and a stereoscopic picture composed of a pair of pictures which are a specified distance apart from these convex lenses and disposed so as to position on the optical axis of each convex lens. It is known as so-called stereoviewer.

This stereoscopic picture is formed so that the pair of pictures are mutually spaced at the specified space.

Using the stereoscopic visual unit having such construction, as the user views the left picture with his left eye via the left convex lens and views the right picture with his right eye via the right convex lens, it can obtain stereoscopic visual effects in the viewing with both eyes.

However, in stereoscopic visual unit, since the aforementioned stereoscopic picture is disposed in the housing of the unit and the pair of pictures are viewed by the reflection of light from the outside, it is insufficient to obtain stereoscopic visual effects.

Moreover, since such stereoscopic visual unit is aimed to stereoscopically view a stereoscopy, it is difficult to be used for other purposes.

DISCLOSURE OF INVENTION

Considering the above points, the present invention provides a stereoscopic visual unit capable of obtaining fine stereoscopic effects and also usable as binoculars.

To solve the above problems, the present invention is provided with a first housing having a pair of convex lenses that are disposed at a specified space and have mutually almost parallel optical axes, and a second housing having supporting parts that are supported swingable on the first housing and can keep a pair of pictures to be stereoscopically viewed on the optical axis of each convex lens in a first swing position, and also a pair of concave lenses that are disposed on the optical axis of each of the convex lenses at positions a specified distance apart from each of the convex lenses in a second swing position are provided.

According to the above structure, when the second housing is at the first swing position, the pair of pictures to be stereoscopically viewed supported by the supporting parts of the second housing are disposed on the optical axis of each convex lens supported by the first housing, respectively. Thereby, the user can obtain stereoscopic visual effects with his both eyes by viewing the left picture with the left eye via the left convex lens and also viewing the right picture with the right eye via the right convex lens.

On the other hand, when the second housing is at the second swing position, the pair of convex lenses supported by the second housing are disposed on the optical axis of each convex lens supported by the first housing, respectively. Thereby, the user can observe a foreground or the like with magnifying of it by viewing the foreground or the like with the left eye via the left convex lens and concave lens and also viewing the foreground or the like with the right eye via the right convex lens and concave lens.

BEST MODE FOR CARRYING OUT THE INVENTION

Hereinafter, an embodiment of the present invention will be described in detail with reference to the accompanying drawings.

Note that, since the embodiment described below is a suitable example of the present invention, various restriction mechanically preferable will be attached. The range of the present invention, however, is not only limited to these modes if the effect of restriction in the present invention will not be particularly described in the description hereinafter.

Figure 1:
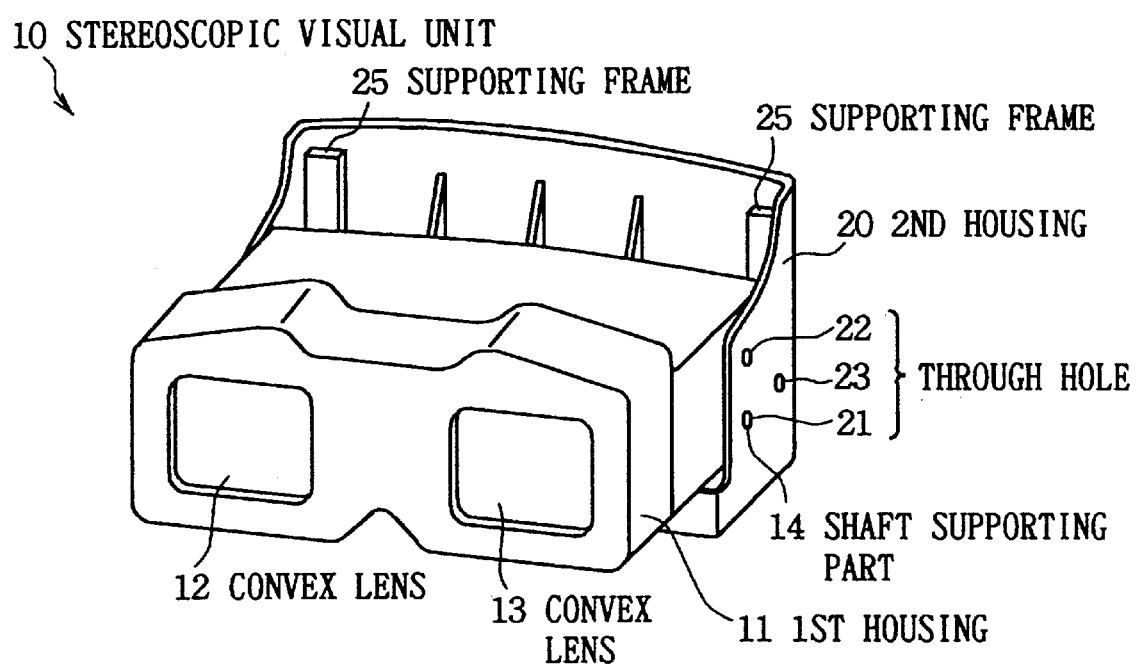
FIG. 1 is a schematic perspective view showing the construction of an embodiment of stereoscopic visual unit according to the present invention.

FIG. 1 is a perspective view showing the constriction of an embodiment of stereoscopic visual unit according to the present invention.

This stereoscopic visual unit 10 is provided with a first housing 11 and a second housing 20 which is supported vertically swingable to the first housing 11.

The first housing 11 is formed in almost rectangular parallelepiped opened fore and aft, and is provided with a pair of convex lenses 12 and 13 that are disposed at the space of almost both eyes and have mutually almost parallel optical axes at the back end.

The whole of second housing 20 is made of a translucent material, e.g., a polystyrene resin in semitransparent milk white. Through holes 21 are interfitted into shaft supporting parts 14 provided on the both sides of the first housing 11, so that the second housing 20 is supported swingable from a first swing position shown in FIGS. 2 and 3 to a second swing position shown in FIGS. 5 and 6.

The second housing 20 is provided with through holes 22 and 23 which are engaged with protrusions provided on the sides of the first housing 11 (not shown) respectively. Thereby, the second housing 20 is locked in the first swing position and the second swing position.

Figure 2:
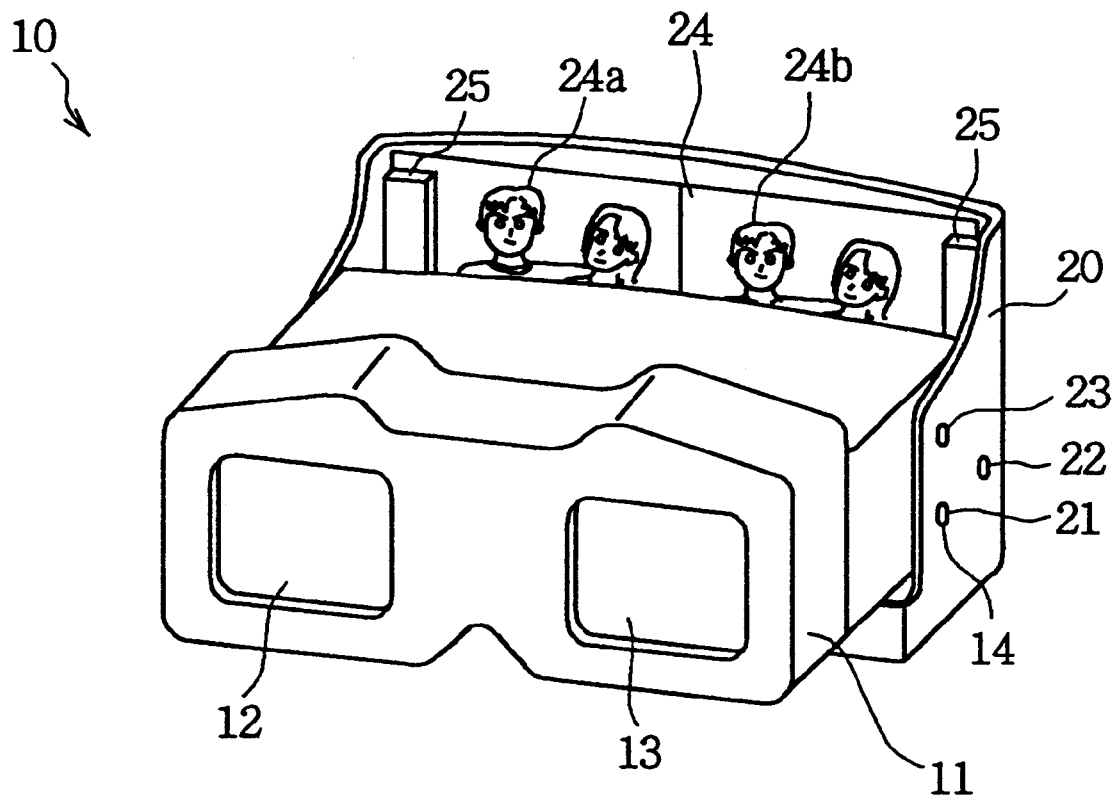
FIG. 2 is a schematic perspective view showing the state of stereoscopical viewing of a stereophotograph in the stereoscopic visual unit of FIG. 1.
Figure 3:
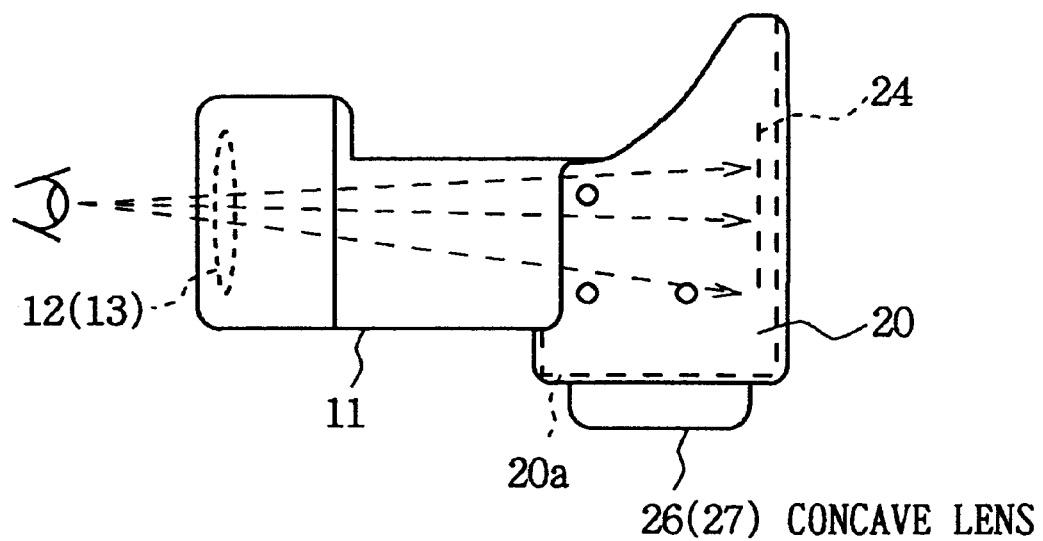
FIG. 3 is a schematic side view showing the state of the stereoscopical viewing of the stereophotograph in the stereoscopic visual unit of FIG. 1.

As the second housing 20 is located at the first swing position as shown in FIGS. 2 and 3, stereoscopic picture 24 to be stereoscopically viewed is kept to be located on the optical axes of the convex lenses 12 and 13 supported by the first housing 11, by supporting frames 25 that are provided on the inside wall of the second housing 20.

At this time, the top of the second housing 20 is opened, and used to attach/detach the stereoscopic picture 24 to/from the supporting frames 25 and to take lights from the outside.

Figure 4:
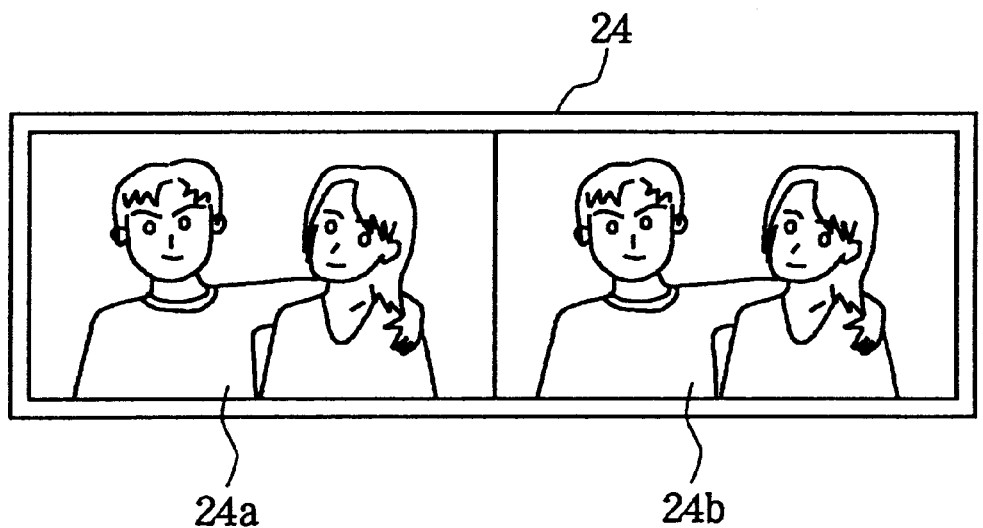
FIG. 4 is a plane view showing an example of stereophotograph used in the stereoscopic visual unit of FIG. 1.

Note that, the stereoscopic picture 24 is that a pair of pictures 24a and 24b mutually having a parallax corresponding to the parallax between both eyes and also having the space almost between the both eyes are printed, on a film made of a semitransparent plastic, as shown in FIG. 4 for example.

Figure 5:
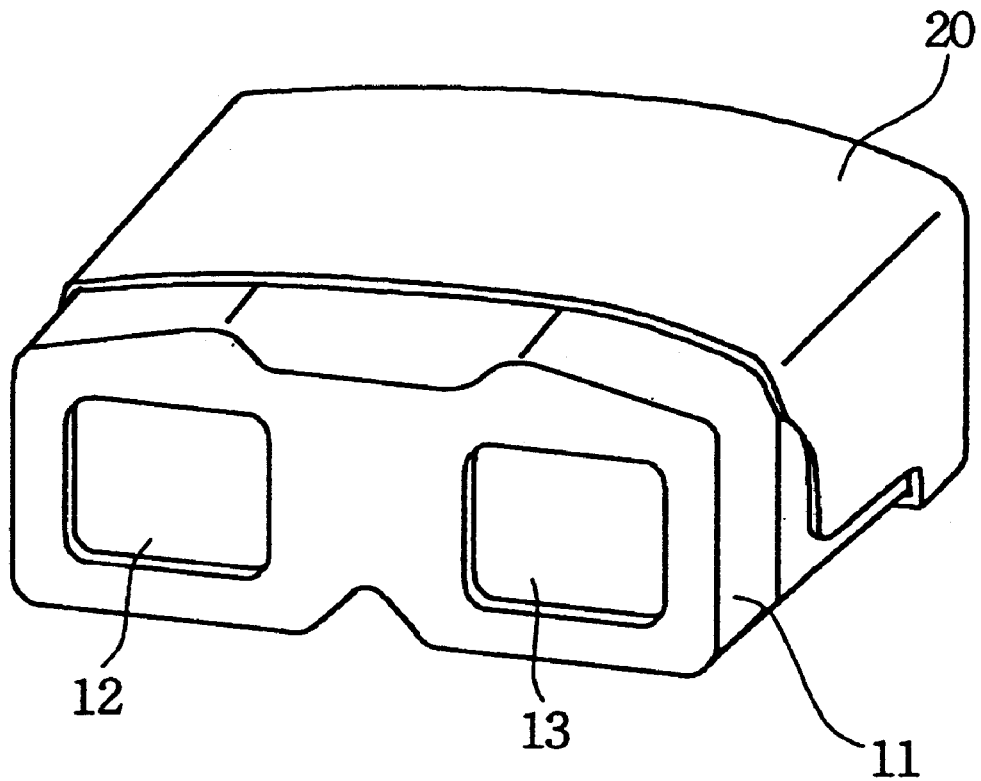
FIG. 5 is a schematic perspective view showing the state when the stereoscopic visual unit of FIG. 1 is used as binoculars.
Figure 6:
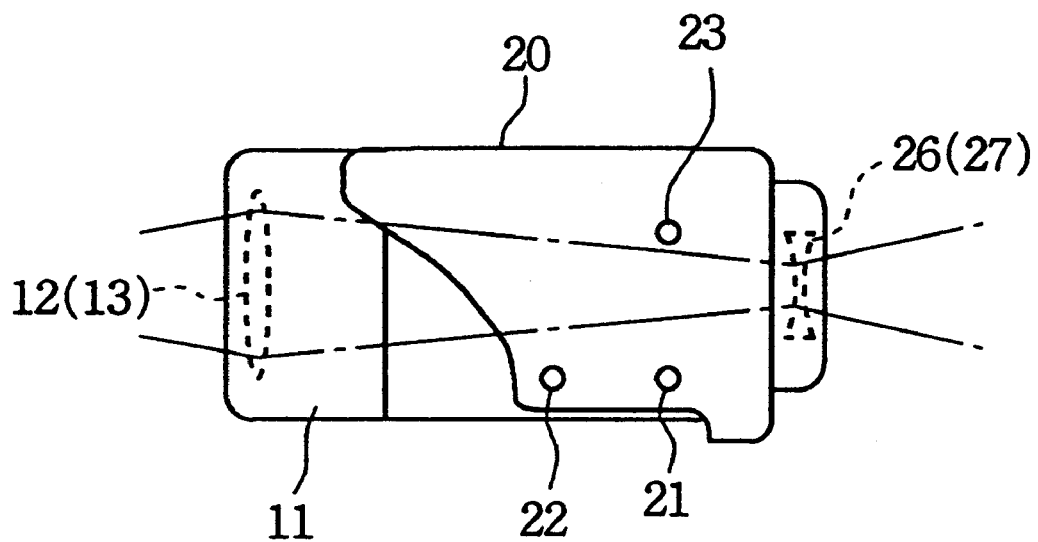
FIG. 6 is a schematic side view showing the state when the stereoscopic visual unit of FIG. 1 is used as the binoculars.

On the other hand, as shown in FIGS. 5 and 6, when the second housing 20 is located at the second swing position, the stereoscopic picture 24 supported by the supporting frames 25 is evacuated upward, and concave lenses 26 and 27 are disposed on the axes of the convex lenses 12 and 13 supported by the first housing 11 respectively.

Here, the optical characteristic of the concave lenses 26 and 27 is preferably selected so as to form the optical system of binoculars along with the convex lenses 12 and 13 supported by the first housing 11.

As shown in FIGS. 2 and 3, these concave lenses 26 and 27 are evacuated under the first housing 11 when the second housing 20 is at the first swing position.

The stereoscopic visual unit 10 is constructed as the above. To stereoscopically view the stereoscopic picture 24, the second housing 20 is swung to the first housing 11, and a rib 20a at the lower end of the second housing 20 is abutted against the bottom of the first housing 11, so that its swing motion is restrained at the first swing position.

The through holes 22 are engaged with the projections provided on the sides of the first housing 11, and the second housing 20 is locked in the first swing position.

Then, the stereoscopic picture 24 is inserted in the supporting frames 25 of the second housing 20 from the aperture part on the second housing 20 and supported.

From this state, the user brings his eyes close to the convex lenses 12 and 13, and views the left picture 24a of the stereoscopic picture 24 with the left eye via the left convex lens 12 and also views the right picture 24b of the stereoscopic picture 24 with the right eye via the right convex lens 13. Thereby, the both pictures 24a and 24b of the stereoscopic picture 24 are synthesized by the visual system of the user, and they are viewed as one stereoscopy.

At this time, the stereoscopic picture 24 is brightly illuminated or backlighted because the lights from the outside are taken through the aperture part on the second housing 20 and the second housing 20 itself, made of the translucent material, more particularly the inner wall located at the rear of the stereoscopic picture 24. Therefore, the user can observe the pictures 24a and 24b as the stereoscopy brilliant and as if lifted, and fine stereoscopic visual effects can be obtained.

On the other hand, in case of using as binoculars, as the second housing 20 is swung to the first housing 11 and located in the second swing position, the through holes 23 of the second housing 20 are engaged with the projections provided on the sides of the first housing 11, and the second housing 20 is locked in the second swing position. Thus, the pair of concave lenses 26 and 27 are disposed on the optical axes of the convex lenses 12 and 13 respectively.

From this state, the user brings the both eyes close to the convex lenses 12 and 13, and views a foreground or the like with his left eye via the left convex lens 12 and concave lens 26 and also views the foreground or the like with his right eye via the convex lens 13 and concave lens 27. Thereby, the stereoscopic visual unit 10 functions as binoculars and enabling the user to observe the foreground or the like with magnifying of it.

Note that, in the aforementioned embodiment, the second housing 20 is made of the translucent material. However, the present invention is not only limited to this but may be made of an opaque material. In this case, the stereoscopic picture 24 is not backlighted because no light from the outside penetrate into the rear of the stereoscopic picture 24 through the second housing 20 itself, but stereoscopic effects can be obtained because it is sufficiently brightly illuminated by lights from the outside incident through the aperture part on the second housing 20.

Industrial Capability

The stereoscopic visual unit is usable to view a stereoscopy and also can use as binoculars.

Explanation of Reference Numerals

10 . . . stereoscopic visual unit, 11 . . . 1st housing, 12, 13 . . . convex lens, 14 . . . shaft supporting part, 20 . . . 2nd housing, 21, 22, 23 . . . through hole, 24 . . . stereoscopic picture, 25 . . . supporting frame.

What is claimed is:

1. A stereoscopic visual unit, comprising:

a first housing having a pair of convex lenses that are disposed at a specified space and have mutually almost parallel optical axes; and a second housing having supporting parts that are supported swingable on said first housing and can keep a pair of pictures to be stereoscopically viewed on the optical axis of said each convex lens in a first swing positions, and also a pair of concave lenses that are disposed on the optical axis of said each convex lens at positions a specified distance apart from said each convex lens in a second swing position.

2. The stereoscopic visual unit according to claim 1, wherein said second housing is made of a translucent material.

3. The stereoscopic visual unit according to claim 1, wherein said second housing is located under said first housing in said first swing position.

4. The stereoscopic visual unit according to claim 1, including a locking device for locking said second housing to said first housing in said first swing position and second swing position.

5. The stereoscopic visual unit according to claim 1, including an aperture part for taking lights from the outside in said picture to be stereoscopically viewed, supported by said supporting parts in said first swing position.

* * * * *